United States Patent [19]
Angelo et al.

[11] Patent Number: 6,061,794
[45] Date of Patent: May 9, 2000

[54] SYSTEM AND METHOD FOR PERFORMING SECURE DEVICE COMMUNICATIONS IN A PEER-TO-PEER BUS ARCHITECTURE

[75] Inventors: Michael F. Angelo, Houston; Sompong P. Olarig, Cypress; David R. Wooten; Dan J. Driscoll, both of Spring, all of Tex.

[73] Assignee: Compaq Computer Corp., Houston, Tex.

[21] Appl. No.: 08/940,551

[22] Filed: Sep. 30, 1997

[51] Int. Cl.[7] .................................................... G06F 12/14
[52] U.S. Cl. ........................... 713/200; 713/201; 380/23; 380/25; 380/4
[58] Field of Search ................... 713/200, 201; 709/225; 380/23, 25, 4

[56] References Cited

U.S. PATENT DOCUMENTS

| | | | |
|---|---|---|---|
| 4,919,545 | 4/1990 | Yu | 380/23 |
| 5,390,351 | 2/1995 | Di Giulio et al. | 709/225 |
| 5,530,701 | 6/1996 | Stillman et al. | 370/410 |
| 5,551,066 | 8/1996 | Stillman et al. | 455/69 |
| 5,559,933 | 9/1996 | Boswell | 395/114 |
| 5,568,552 | 10/1996 | Davis | 380/23 |
| 5,600,803 | 2/1997 | Iitsuka et al. | 709/225 |
| 5,657,445 | 8/1997 | Pearce | 713/200 |
| 5,692,124 | 11/1997 | Holden et al. | 709/225 |
| 5,706,431 | 1/1998 | Otto | 709/221 |
| 5,724,027 | 3/1998 | Shiman et al. | 380/25 |
| 5,745,678 | 4/1998 | Herzberg et al. | 380/4 |
| 5,784,464 | 7/1998 | Akiyama et al. | 713/201 |
| 5,787,175 | 7/1998 | Carter | 380/25 |
| 5,787,427 | 7/1998 | Benantar et al. | 380/25 |
| 5,805,880 | 9/1998 | Pearce et al. | 713/200 |
| 5,826,014 | 10/1998 | Coley et al. | 713/201 |
| 5,832,228 | 11/1998 | Holden et al. | 709/225 |
| 5,841,976 | 11/1998 | Tai et al. | 709/225 |
| 5,859,911 | 1/1999 | Loucks et al. | 380/25 |
| 5,889,958 | 3/1999 | Willens | 713/201 |
| 5,898,780 | 4/1999 | Liu et al. | 380/25 |
| 5,903,721 | 5/1999 | Sixtus | 713/201 |
| 5,931,947 | 8/1999 | Burns et al. | 713/201 |

OTHER PUBLICATIONS

Stallings, William, *Network and Internetwork: Security Principles and Practice*, Prentice Hall, Englewood Cliffs, New Jersey, 1995, pp. 1–3.

Intelligent I/O ($I_2O$) Architecture Specification, Draft Revision 1.5, Mar. 1997, pp. 1–1 through 17.

*Primary Examiner*—Robert W. Beausoliel, Jr.
*Assistant Examiner*—Wasseem Hamdan
*Attorney, Agent, or Firm*—Conley, Rose & Tayon, P.C.; Robert C. Kowert; Kevin L. Daffer

[57] ABSTRACT

A system and method for performing secure peer-to-peer device communications on an I/O bus, such as a PCI bus, a Fiber Channel bus, an IEEE, 1394 bus or a Universal Serial Bus. The system includes a plurality of intelligent I/O devices, such as intelligent storage devices and/or controllers, communications devices, video devices and audio devices. The I/O devices perform peer-to-peer message and data transfers, thereby bypassing the operating system running on the computer's CPU. The intelligent I/O devices encrypt messages and data before transmitting them on the I/O bus and conversely decrypt the messages and data upon reception. The encryption provides secrecy and/or authentication of the sender. The devices use keys or passwords to encrypt/decrypt the data. The keys are stored in non-volatile memory in the devices and are distributed to the devices by the system BIOS at initialization time. The devices perform access authorization validation using rule sets also distributed by the BIOS at initialization time. The rule sets specify which I/O operations are valid for a peer I/O device to request of a respective I/O device based, preferably, upon the device class/subclasses of the requesting device. In another embodiment, one of the intelligent I/O devices may be a communications device which serves as a firewall for the I/O bus. In this embodiment, the rule set further includes identification information of the remote machines/devices.

34 Claims, 9 Drawing Sheets

| 60 | READ | WRITE | SEEK | MODE CHANGE | ABORT I/O |
|---|---|---|---|---|---|
| Storage: SCSI: disk | A | U | U | U | U |
| Storage: SCSI: tape | A | U | U | U | U |
| Storage: IDE: CDROM | U | A | A | U | U |
| Network: Ethernet | A | A | A | U | A |
| Network: FDDI | A | A | A | U | A |
| Display: VGA | A | A | A | U | A |
| Multimedia: Audio | A | A | A | U | A |

FIG. 5a

| 62 | READ | WRITE | SEEK | MODE CHANGE | ABORT I/O |
|---|---|---|---|---|---|
| system A: Storage: SCSI: disk | A | U | U | U | U |
| system A: Storage: SCSI: tape | A | U | U | U | U |
| system A: Storage: IDE: CDROM | U | A | A | U | A |
| system A: Network: Ethernet | A | A | A | U | A |
| system A: Network: FDDI | A | A | A | U | A |
| system A: Display: VGA | A | A | A | U | A |
| system A: Multimedia: Audio | A | A | U | U | U |
| system B: Storage: SCSI: tape | A | U | U | U | U |
| system C: CPU | A | A | A | U | A |

SYSTEM AND METHOD FOR PERFORMING SECURE DEVICE COMMUNICATIONS IN A PEER-TO-PEER BUS ARCHITECTURE

BACKGROUND OF THE INVENTION

1. Field of the Invention

This invention relates to computer systems which employ a peer-to-peer bus architecture, and in particular to secure communications between the devices coupled to the peer-to-peer bus in such systems.

2. Description of the Related Art

William Stallings, in his textbook *Network and Internetwork Security: Principles and Practice* (1995, Prentice Hall), which is hereby incorporated by reference in its entirety as though fully set forth herein, cites a National Research Council report as follows: "Security is a concern of organizations with assets that are controlled by computer systems. By accessing or altering data, an attacker can steal tangible assets or lead an organization to take actions it would not otherwise take. By merely examining data, an attacker can gain a competitive advantage, without the owner of the data being any the wiser." Stallings goes on to define computer security as "the generic name for the collection of tools designed to protect data and to thwart hackers." Stallings defines several computer security services such as confidentiality, integrity, authentication, and access control.

Stallings says that "confidentiality requires that the information in a computer system and transmitted information be accessible only for reading by authorized parties. This type of access includes printing, displaying, and other forms of disclosure, including simply revealing the existence of an object. Confidentiality is the protection of transmitted data from passive attacks." Thus, confidentiality services are primarily concerned with preventing unauthorized parties from accessing confidential information. Confidentiality may also be referred to as secrecy or privacy. One common form of a confidentiality service is data encryption.

Stallings says that "integrity requires that computer system assets and transmitted information be capable of modification only by authorized parties. Modification includes writing, changing, changing status, deleting, creating, and the delaying or replaying of transmitted messages." Stallings says that, "In the context of network security, access control is the ability to limit and control the access to host systems and applications via communications links. To achieve this control, each entity trying to gain access must first be identified, or authenticated, so that access rights can be tailored to the individual." Thus, the issues of integrity and access control are concerned with identification, authentication and authorization. Typically, a user or entity must identify itself when requesting to modify information, and an authorization service validates whether or not the identity is authorized to perform the modification.

Often, prior to validation of a requester's authorization, the identity of the requester must be authenticated. As Stallings says, "the authentication service is concerned with assuring that a communication is authentic. Authentication is a procedure to verify that received messages come from the alleged source and have not been altered." That is, authentication concerns itself with the question: is the entity making the request really who it says it is and has the request been altered? Techniques for performing authentication include cryptographic checksums, hash functions, digital signatures, and message encryption via secret keys, or passwords, public/private keys, etc. These techniques are well known in the art of network security and are described in detail in Stallings.

Figure 1:
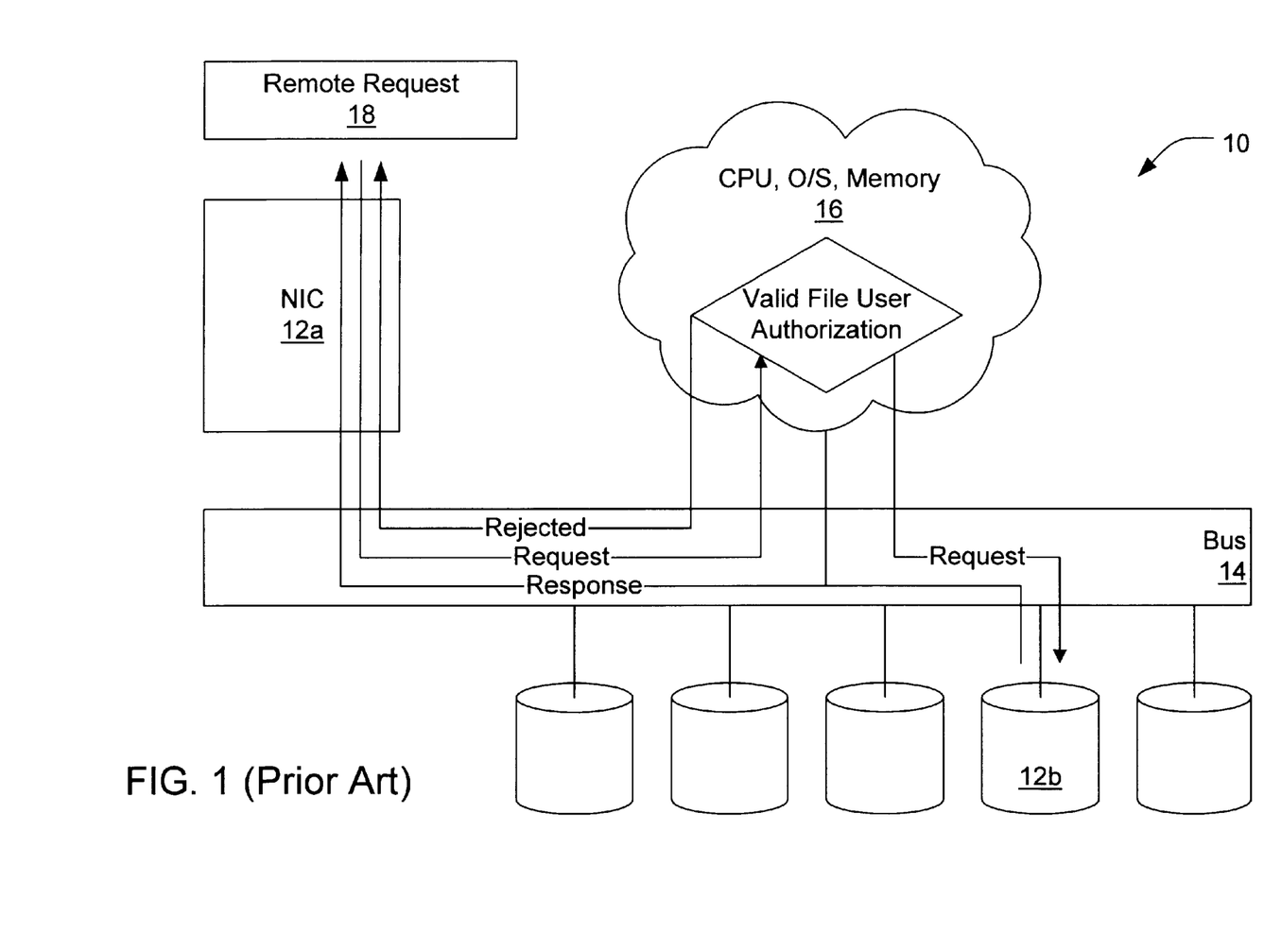
FIG. 1 is a block diagram of a traditional prior art computer system, such as may be part of a network or inter network which employs well know security service means.

FIG. 1 shows a traditional computer system 10, such as may be part of a network or internetwork whose security is discussed in the Stallings reference. The computer system 10 includes a plurality of devices 12 coupled to an I/O bus 14. For example, one of the devices 12 is a network interface card (NIC) 12a which receives a request 18 for data from a remote source. An example of the remote source may be another computer coupled to the computer 10 by a local area network, such as an Ethernet or Token Ring network. The requested data in the example may reside on a disk drive 12b also coupled to the I/O bus 14.

The network interface card 12a communicates the remote request 18 to an operating system 16 executing on the central processing unit (CPU) of the system 10. In the traditional system, the operating system 16 executing on the system CPU is largely responsible for providing the security services such as confidentiality, access control and integrity, and authentication as follows.

The remote request 18 includes information identifying the source of request 18. The operating system 16 executing on the system CPU uses the identify information to validate the requesting source's authority to make the request 18 to read the requested data. For example, a machine ID and/or user name may be looked up in an authorization table to determine if the requester is authorized to access the data. If not, the request 18 is rejected. The authorization determination made by the operating system 16 may also include making distinctions based upon the type of operation requested in the request 18. For example, the request source may be authorized to read data but not to write data. Thus, the operating system 16 may reject a write request but perform a read request, for example.

Furthermore, request 18 may include authentication information, also referred to as an "authenticator." The authenticator enables the operating system 16 executing on the system CPU to authenticate whether or not request 18 did indeed come from the remote source whose identity is included in the request 18. The authenticator may be a cryptographic checksum, which is a public function of the request and a secret key known by the request source, included by the request source in the request 18. Cryptographic checksums are also referred to as message authentication codes (MACs). The operating system 16, knowing the secret key also, recomputes the checksum and compares it with the checksum in the request 18. The authenticator may also be a hash code. Hash codes are also referred to as message digests. A hash code is a function of all the bits of the message and provides an error detection capability. The authenticator may also be a digital signature.

Furthermore, the message itself may be encrypted by the remote request 18 source using a secret key (e.g., password) or private key. The encryption provides privacy from unauthorized persons who may be snooping the network to illicitly capture confidential information. In this case, the operating system 16 executing on the system CPU may authenticate the request 18 by decrypting the request 18 using the same secret key used by the request source or by using the public key associated with the private key. In this case, the entire encrypted request 18 itself serves as the authenticator. The fact that the remote request 18 is encrypted provides confidentiality, i.e., secrecy or privacy, of the request 18.

Thus, the operating system 16 executing on the system CPU receives the request 18 from NIC 12a. If request 18 is encrypted, the operating system 16 decrypts the message and potentially performs authentication based upon the decryption. If some other authenticator is present, such as a checksum or hash code, the operating system 16 performs authentication on the request 18 using the proper authenticator. If the request 18 is not authentic, the operating system 16 rejects the remote request 18. The operating system 16 (executing on the system CPU) then determines if the remote source is authorized to receive the requested data. If not, the operating system 16 rejects the remote request 18.

If the remote source is authorized, the operating system 16 determines if the requested data exists and, if so, requests the data from, e.g., disk 12b. The operating system 16 executing on the system CPU encrypts the data, possibly includes an authenticator with the data, and forwards the data to NIC 12a. NIC 12a forwards the encrypted and authenticated data to the remote source. Thus in traditional systems, the security services for data communications between devices are primarily performed by the operating system 16 executing on the system CPU.

As device and bus technology become more intelligent, a new paradigm of I/O device communication is emerging. This paradigm is direct I/O device communication, or peer-to-peer communication. In the peer-to-peer I/O device communication paradigm, the I/O devices within a system communicate data between one another directly, that is, without the involvement of the operating system. In view of the discussion of security services above, it is apparent that bypassing the operating system, as is done in peer-to-peer bus architectures, removes opportunity for the operating system to perform the security services.

Figure 2:
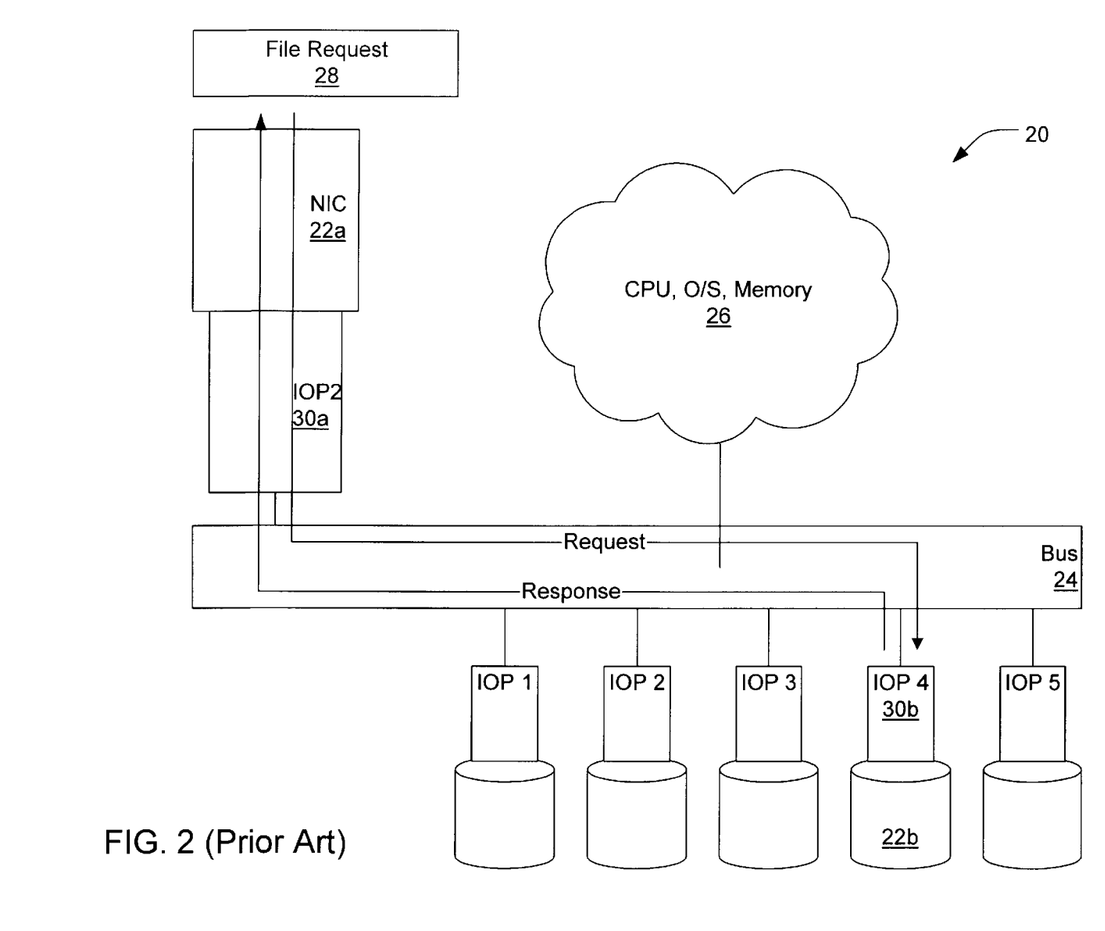
FIG. 2 is a prior art block diagram of a computer system in which intelligent devices are coupled together by an I/O bus and which perform peer-to-peer communications, but which provide no security services.

FIG. 2 illustrates a computer system 20 in which intelligent devices 22 are coupled together by an I/O bus 24. The intelligent devices may include intelligent input/output processors (IOP) 30. For example, the I/O bus 24 may be a Peripheral Component Interconnect (PCI) bus and the devices 22 may be devices which conform to the Intelligent I/O (I₂O) Specification Draft 1.5 of March 1997 which is hereby incorporated by reference.

In system 20 of FIG. 2, the NIC 22a receives a remote request 28 like the request of FIG. 1. However, in system 20, NIC 22a makes a request for data directly to the disk 22b, rather than making the request to the operating system 26. In response, the disk 22b provides the data to the NIC 22a, without the intervention of the operating system 26. This new paradigm potentially improves the data throughput and transfer speeds of the system. However, with the operating system 26 no longer involved in the validation, encryption, and authentication of the transfer, potential security problems exist such as unauthorized access to, tampering with, or snooping of the data.

Another example of a data communication using the peer-to-peer paradigm is a fast restore of a disk drive from a tape backup. In this scenario, an intelligent tape drive transfers data directly to an intelligent disk drive to restore lost data onto a new disk installed to replace a failed disk. This peer-to-peer operation may drastically improve performance of the restore operation since the operating system need not be involved in the data transfer. However, the possibility exists for an unauthorized I/O device on the bus to write to the disk drive and destroy valid data since no security means are in place via the operating system.

Another example of a data communication using the peer-to-peer paradigm is a transfer of video information, such as a copyrighted movie, from an intelligent storage device directly to an intelligent video device on an I/O bus. The possibility exists for an unauthorized I/O device on the bus, such as an intelligent digital video disk (DVD) writer to snoop the bus during the data transfer and pirate the movie since no security means are in place via the operating system. Similarly, an unauthorized device might snoop key strokes coming from a keyboard connected to a system via a Universal Serial Bus (USB).

An important aspect of system administration in large networked facilities is the ability to perform the system administration remotely from a central system administration location. Examples of the system administration include diagnosing system problems and performing software upgrades or firmware upgrades of system components remotely. Traditionally, the operating system or Basic Input Output System (BIOS) of the remote system is used to perform security services during remote administration. However, in a peer-to-peer paradigm, the operating system or BIOS can no longer provide the security services. Therefore, a method for providing security in a peer-to-peer communication system is desired.

SUMMARY OF THE INVENTION

The problems outlined above are in large part solved by the system and method of the present invention. The system includes a plurality of I/O devices coupled to an I/O bus, such as a PCI bus, an IEEE 1394 bus, a Fibre Channel bus, or a Universal Serial Bus. The I/O devices are configured to exchange messages which include requests to perform I/O operations such as reads or writes, and to exchange the data associated with the I/O operations. The messages and data are exchanged directly with one another to perform peer-to-peer data communications. That is, the I/O devices communicate with one another without intervention from an operating system executing on a CPU. The I/O devices are intelligent devices, including I/O processors, and perform security services, at least a portion of which the operating system would have heretofore provided in prior systems, involving non-peer-to-peer communication.

To provide confidentiality, i.e., to keep the messages and data from being snooped on the I/O bus, the I/O devices encrypt the messages and data before transmitting them on the I/O bus and decrypt the messages and data upon reception. Various methods for protecting information can be employed, such as digital signatures, secret key encryption, public/private key encryption (such as the RSA algorithm), and stegenography. The I/O devices include non-volatile memory for storing the key sets which are received from a system Basic Input Output System (BIOS) during initialization of the computer system. The system BIOS determines the local I/O device configuration during initialization and distributes the appropriate key sets to the I/O devices as necessary.

To provide authentication, i.e., to insure that a message or data received by one I/O device from another I/O device really did originate from the alleged I/O device, the requesting I/O device authenticates the message or data before sending the message or data. In one embodiment, the message or data includes a digital signature which is a checksum or hash code, which may be used by the receiving I/O device to determine if the message or data is valid. In another embodiment, the authenticator is the encrypted message. Thus, in this embodiment, the authentication and confidentiality services are performed together by the encryption/decryption of the messages or data. The I/O devices use the key sets to authenticate the messages and data.

To provide integrity and access control services, the receiving I/O device validates that the requesting I/O device is authorized to request the receiving I/O device to perform the requested I/O operation. The receiving I/O device validates the I/O request authorization based upon a rule set stored in the non-volatile memory by the receiving I/O device. For example, an I/O device may reject a write request from a peer device but may perform a read request from the same peer device based upon the rule set. The system BIOS builds the rule set at system configuration or during system initialization based upon the determination of the local I/O devices present, and distributes the rule sets to the I/O devices accordingly. Preferably, the BIOS builds the rule set from a default rule set modified according to input from the system administrator. Preferably, the rule sets are based upon the classes and subclasses of the various I/O devices.

In one embodiment, one or more of the I/O devices comprise an intelligent communications I/O device which functions as a "bus firewall" of sorts. The communications device couples to a network of remote computer systems, such as a local area network (LAN) like Ethernet or Token Ring, or wide area network (WAN), and receives request packets from the remote computers. The packets include requests for the communications device to request another I/O device on the bus, such as an intelligent mass storage device or multimedia device, to perform an I/O operation. Preferably, the rule set of the communications device includes additional information identifying the remote computers and includes authorized I/O operation rules for each of the remote computers. Preferably, the communications device also includes in its key set one or more keys for the remote computers. Preferably, the communications device performs authentication and authorization services on the packets received from the remote computer and forwards the I/O request to the storage I/O device only if the packet is authentic and valid. In an alternate embodiment, the communications device simply forwards the I/O request to the storage device and the storage device performs the authentication and authorization services.

Broadly speaking, the method of the present invention protects a first device coupled to an I/O bus from being accessed in an unauthorized peer-to-peer manner by a second device coupled to the I/O bus. The method comprises the second device transmitting on the I/O bus to the first device an authenticated message including a request to perform a peer-to-peer I/O operation. The first device receives the digitally signed message and determines if the message is really derived from the second device. The first device determines if the second device is authorized to request the first device to perform the peer-to-peer I/O operation. The first device performs the peer-to-peer I/O operation only if the peer-to-peer I/O operation request is truly from the second device and if the second device is authorized to request the peer-to-peer I/O operation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
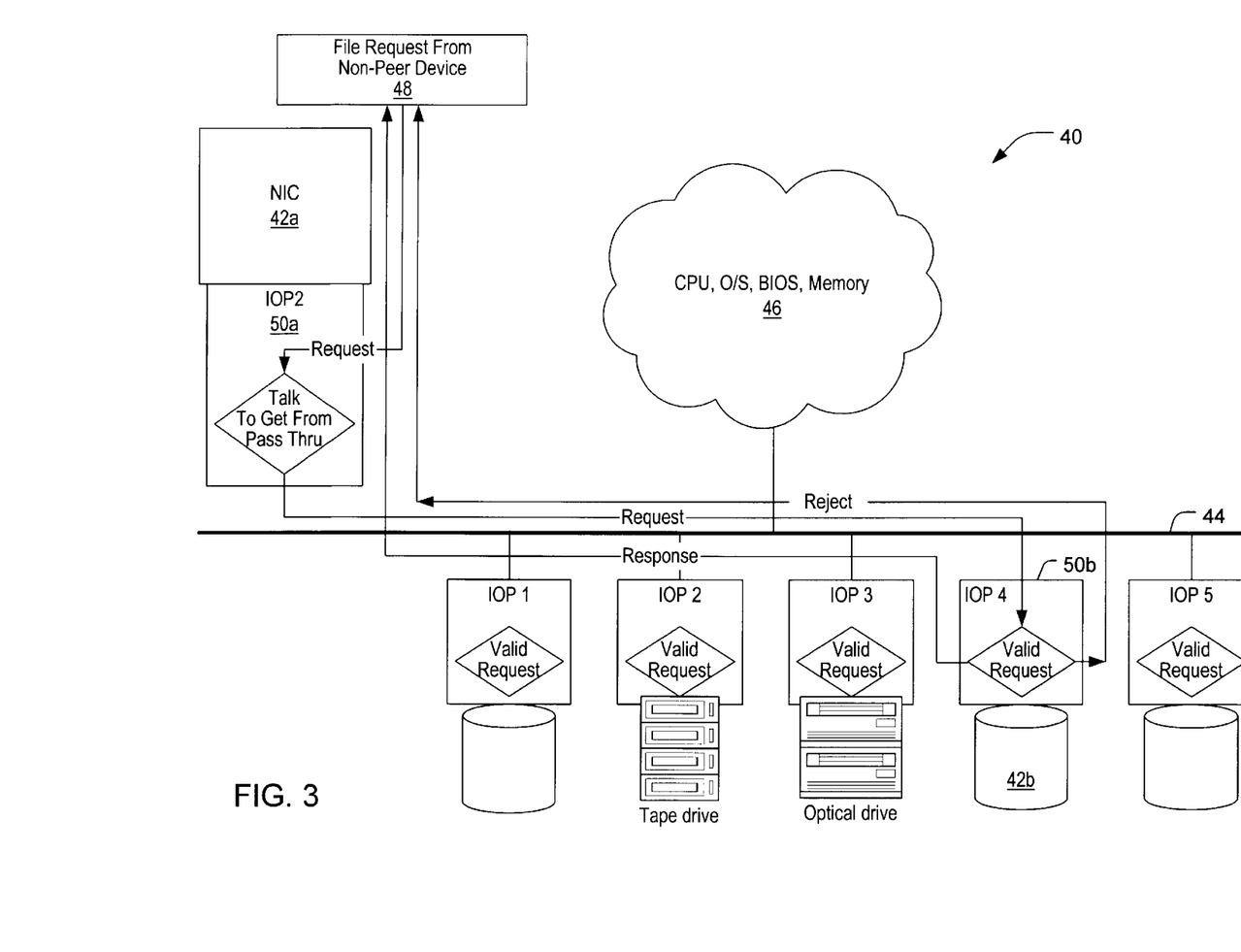
FIG. 3 is a block diagram is shown illustrating a computer system in which secure peer-to-peer communications may be performed according the present invention.

FIG. 3—Secure Peer to Peer Architecture

Referring to FIG. 3, a block diagram is shown illustrating a computer system 40 in which secure peer-to-peer communications may be performed according the present invention. The system 40 comprises a CPU and memory which execute an operating system and/or system BIOS 46. The CPU and memory 46 are operably coupled to an I/O bus 44. Preferably, the I/O bus 44 is a PCI bus. However, the I/O bus 44 is intended to include any I/O bus which allows peer-to-peer device communications, such as an IEEE 1394 bus, a Universal Serial Bus (USB) or a Fibre Channel bus.

The system 40 further comprises a plurality of intelligent I/O devices 42 each coupled to the I/O bus 44. The I/O devices 42 include intelligent I/O processors 50. For example, an intelligent communications device 42a, such as a network interface card (NIC) or IEEE 1394 bus bridge, may be coupled to the I/O bus 44. The NIC 42a includes an I/O processor 50a. Furthermore, an intelligent disk drive 42b may be coupled to the I/O bus 44 and include an I/O processor 50b. An example of an intelligent I/O processor is an Intel i960 RISC processor. In one embodiment, the I/O processors 50 are comprised in an intelligent controller, such as a Redundant Array of Inexpensive Disks (RAID) controller, which controls a plurality of disk drives. The RAID controller couples the disk drives to the I/O bus 44 and controls I/O operations on the disk drives. In another embodiment, the I/O processors 50 are embedded in the I/O devices 42 themselves.

The intelligent I/O processors 50 control the I/O devices 42 to perform I/O operations on the I/O devices 42. Examples of the I/O operations include those operations typically performed on I/O devices such as read, write, seek, rewind, eject media, load media, abort I/O, etc. Advantageously, the intelligent I/O processors, also perform security services regarding peer-to-peer data communications between the devices 42, as will be described below.

Figure 4:
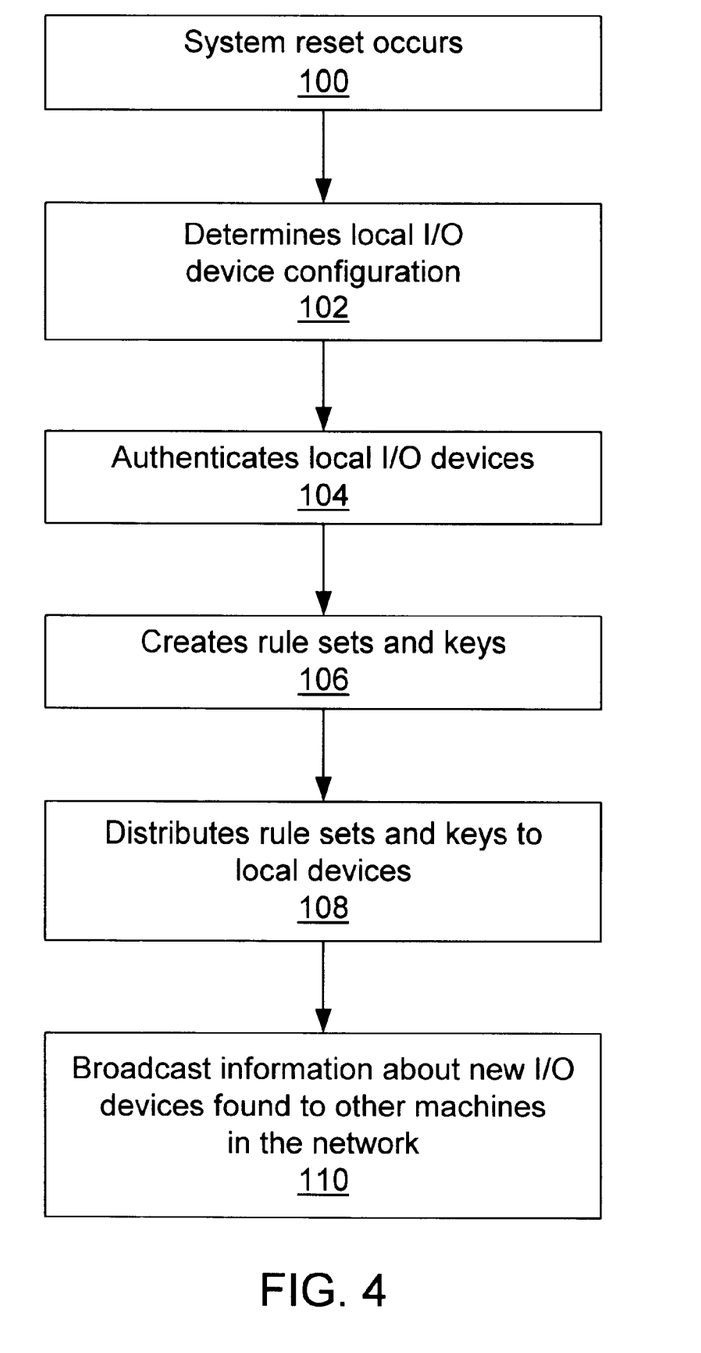
FIG. 4 is a flowchart illustrating steps taken during initialization of the system of FIG. 3.

FIG. 4—Initialization Flowchart

Referring now to FIG. 4, a flowchart illustrating steps taken during initialization of the system 40 of FIG. 3 is shown. A reset of the system 40 occurs in step 100. After the reset, the system BIOS 46 determines the configuration of the local I/O devices 42 connected to the I/O bus 44, in step 102. In one embodiment, determining the local I/O device configuration includes performing PCI configuration, similar to PCI enumeration performed in conventional PCI systems. That is, the BIOS performs PCI configuration cycles to determine which PCI slots are occupied (i.e., identified) with devices and to read configuration information, such as the device ID, vendor ID and class code, from each of the I/O devices 42 present in the PCI slots.

In addition to the standard PCI configuration, preferably the BIOS 46 also performs authentication to insure that I/O devices reporting themselves as local devices are in fact local devices, in step 104. The authentication is performed in order to prevent a remote device from masquerading as a local device and thereby avoid authorization checks performed during run-time operation by the I/O devices 42. Preferably, the authentication is performed by providing a unique code associated with the local computer system 40 to each of the local I/O devices 42 when the local I/O device 42 is installed into the system 40. Each of the I/O devices 42 authenticates itself by providing the unique code to the BIOS 46. The BIOS 46 is thus capable of excluding from the list of local I/O devices any device which does not provide the unique code.

After the local I/O device configuration determination and authentication, the BIOS 46 creates rule sets and key sets to be used by the I/O devices 42 to perform security services, in step 106. The rule sets comprise a unique set of rules for each of the I/O devices 42 which a first I/O device, such as I/O device 42b uses to perform access control and integrity services. That is, the first I/O device 42b use the rule sets to validate whether or not a peer second I/O device, such as 42a requesting the first I/O device 42b to perform an I/O operation is authorized to request the first I/O device 42b to perform the I/O operation.

Figure 5A:
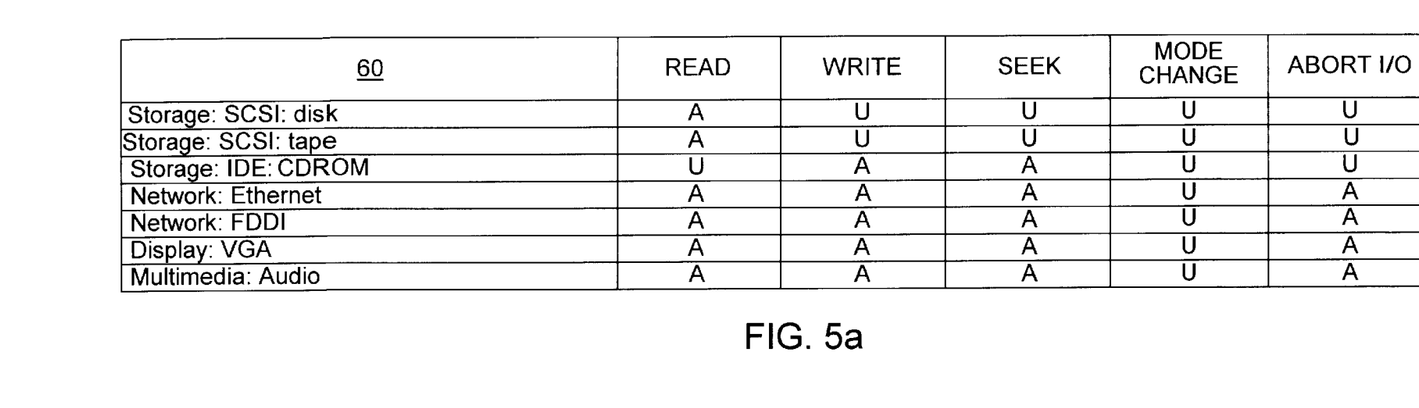
FIGS. 5a and 5b are illustrations of exemplary rule set tables used by the peer-to-peer devices in FIG. 3 to perform secure peer-to-peer communications on the I/O bus.
Figure 5B:
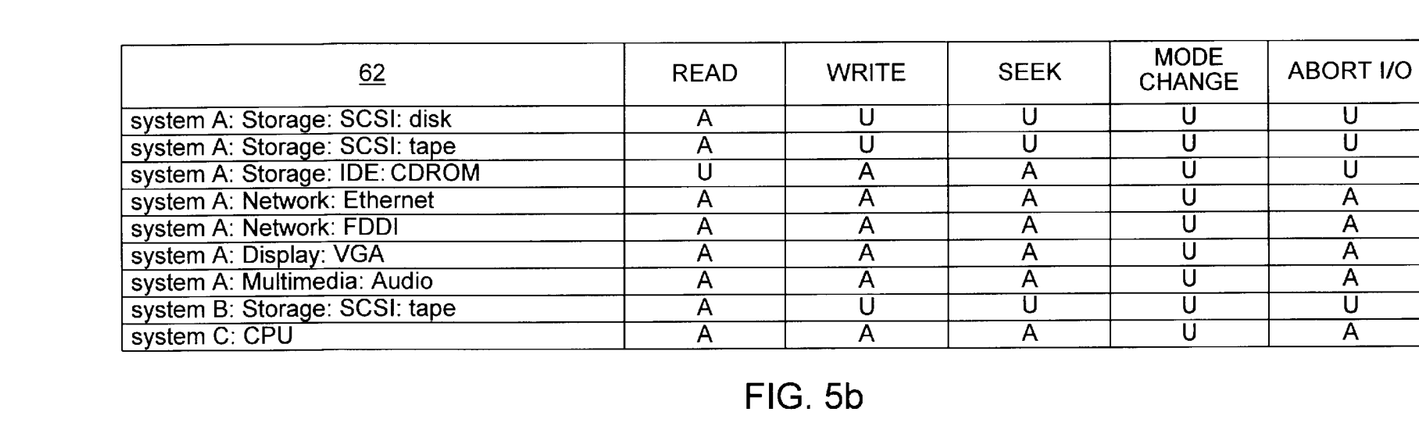

FIGS. 5a and 5b—Rule Sets

Referring now to FIG. 5a, an illustration of an exemplary rule set table 60 is shown. The rule set table 60 may be a rule set of the disk device 42b of FIG. 3, for example. The rule set table 60 includes rows corresponding to the I/O devices 42 detected and authenticated in steps 102 and 104. Preferably, the I/O devices 42 are identified according to classes and subclasses, as shown. In one embodiment, the classes correspond to PCI device base classes, such as Storage, Network, Display, Multimedia, etc. Likewise, the first level of subclasses correspond to PCI subclasses, such as SCSI, IDE, Ethernet, FDDI, VGA, Audio, etc. Further subclasses may be defined, such as disk, tape, CDROM, etc. as shown.

The rule set table 60 includes columns corresponding to some of the various I/O operations which may be performed by the disk drive 42b, such as read, write, seek, mode change, and abort I/O. The list of I/O operations are in no way intended to be an exhaustive list of possible I/O operations, but rather a representative list. In one embodiment, the I/O devices 42 conform to the I$_2$O Specification and the list of I/O operations conforms to operations defined in the I$_2$O Specification. In another embodiment, the list of I/O operations conforms to operations defined in the SCSI-3 Specification. In another embodiment, the list of I/O operations conforms to operations defined in the IDE Specification. The list of I/O operations for a given rule set table may vary depending upon the class of I/O device.

The present invention relates to a system and method for providing secure communications on peer-to-peer buses. Various peer-to-peer bus embodiments are described by way of example, and in particular, an embodiment in which the I/O bus of FIG. 3 is a PCI bus is described in detail. However, the present invention is not intended to be restricted to the embodiments disclosed, but rather is intended to include device communications on any bus architecture in which peer-to-peer device I/O operations may be performed and in which a requirement exists for the operations to be secure. For example, the IEEE 1394 bus standard prohibits bus snooping. However, there is no means specified in the standard to prevent bus snooping. Thus, a secure communications system and method as described herein is desirable for the IEEE 1394 bus.

Each element of the table 60 specifies whether or not the given I/O operation is authorized (denoted by an "A") or unauthorized (denoted by a "U") with respect to the I/O device of the corresponding row, as shown. For example, the SCSI tape drive is authorized to read from the disk drive 42b, but is not authorized to perform any of the other I/O operations listed.

Preferably, the BIOS 46 includes default rule sets according to device classes and subclasses which are used to create the rule sets in step 106. Preferably, the rule sets created from the default rule sets are also subject to modification according to user input, such as may be provided by a system administrator. In particular, when a new device is detected during step 102, the BIOS 46 may display a screen in a system console prompting the system administrator for a rule set and/or key set.

Referring now to FIG. 5b, an illustration of a second exemplary rule set table 62 is shown. The rule set table 62 is similar to the rule set table 60 and further includes a system identification portion for identifying the devices in the rule set, as shown. In one embodiment, the identification portion includes the Internet Protocol (IP) address of the remote machine. In another embodiment, the identification portion includes a serial number associated with the remote machine. In another embodiment, the identification portion includes a cluster node ID associated with the remote machine. In the another embodiment, the identification portion further includes the PCI address (e.g., memory mapped address or device ID) of the requesting device on the remote machine. In another embodiment, the identification information includes user identification, which is grouped according to communities or organizations or groups within a company. This embodiment, is particularly advantageous in a wide area network (WAN) embodiment, in which multiple remotely located locations within a company may access shared information in an efficient manner. By including a provision for system identification, the authorization of other devices remote from the system 40, i.e., a non-peer device, to issue requests to the I/O devices 42 local to the system 40 to perform I/O requests may be validated. As shown, table 62 further includes an entry for a SCSI tape drive on a remote machine B and an entry for a CPU on a remote machine C. Preferably, the remote machines B and C are coupled to the local system 40 (denoted as "System A" in the table 62) via a network, such as by the Ethernet or FDDI network devices of the system 40 shown in the rule set table 62. More detail about the use of the rule sets by the I/O devices 42 will be described below.

The rule set tables shown in FIGS. 5a and 5b describe embodiments of a manner in which to organize the rule sets. It is understood that many methods of organizing the rule sets may be satisfactory and the exemplary table illustrated is not intended to limit the scope of the invention, but rather to more clearly illustrate the invention by way of example. For example, another embodiment is contemplated in which the rows in the tables are further specified according to particular users on a remote system.

Referring again to FIG. 4, the key sets comprise a unique set of passwords, secret keys or public/private keys which the I/O devices 42 use to perform authentication and/or confidentiality services. The second I/O device 42a uses its key set to authenticate messages which the second I/O device 42a sends to the first I/O device 42b. That is, preferably, the second I/O device 42a generates an authenticator to include in the message using a key associated with the first I/O device 42b. Conversely, the first I/O device 42b uses the key set to authenticate whether or not the message allegedly sent by the second I/O device 42a was in fact sent by the second I/O device 42a.

Furthermore, the first I/O device 42b uses its key set to encrypt messages and data sent to the second I/O device 42a and to decrypt messages and data received from the second I/O device 42a. Conversely, the second I/O device 42a uses its key set to encrypt messages and data sent to the first I/O device 42b and to decrypt messages and data received from the first I/O device 42b. Preferably, the key sets are provided to the system BIOS 46 by a system administrator. Preferably, the rule sets and key sets are stored in the I/O devices 42 in a non-volatile memory, such as a FLASH memory, a black box memory, or a system management memory.

The rule sets and key sets can either be created by the BIOS 46 in an auto configure process or independently by an administrating configuration process in step 108. Preferably, the rule sets and key sets are distributed to the I/O devices 42 in a confidential manner. In one embodiment, the BIOS 46 encrypts the rule sets and key sets using a secret key. The devices 42 decrypt the rule sets and key sets using the secret key, preferably supplied by the BIOS 46 to the I/O devices 42 when installed in the system 40.

After the rule sets and key sets are distributed, information about new local devices found and authenticated on the I/O bus 44 during steps 102 and 104 is broadcast to other machines in the network, in step 110. Preferably, after the rule sets and key sets are distributed, the key sets are erased from system memory for increased security.

FIG. 6—Operational Flowchart

Referring now to FIGS. 6a–6d (referred to collectively as FIG. 6), a flowchart illustrating steps taken by the I/O devices 42 of FIG. 3 to perform secure peer-to-peer communications is shown. For brevity, reference will be made to a first I/O device 42a and a second I/O device 42b in the description of FIG. 6. The first and second I/O devices 42a and 42b are intended to be representative of the I/O devices 42 of FIG. 3.

Figure 6A:
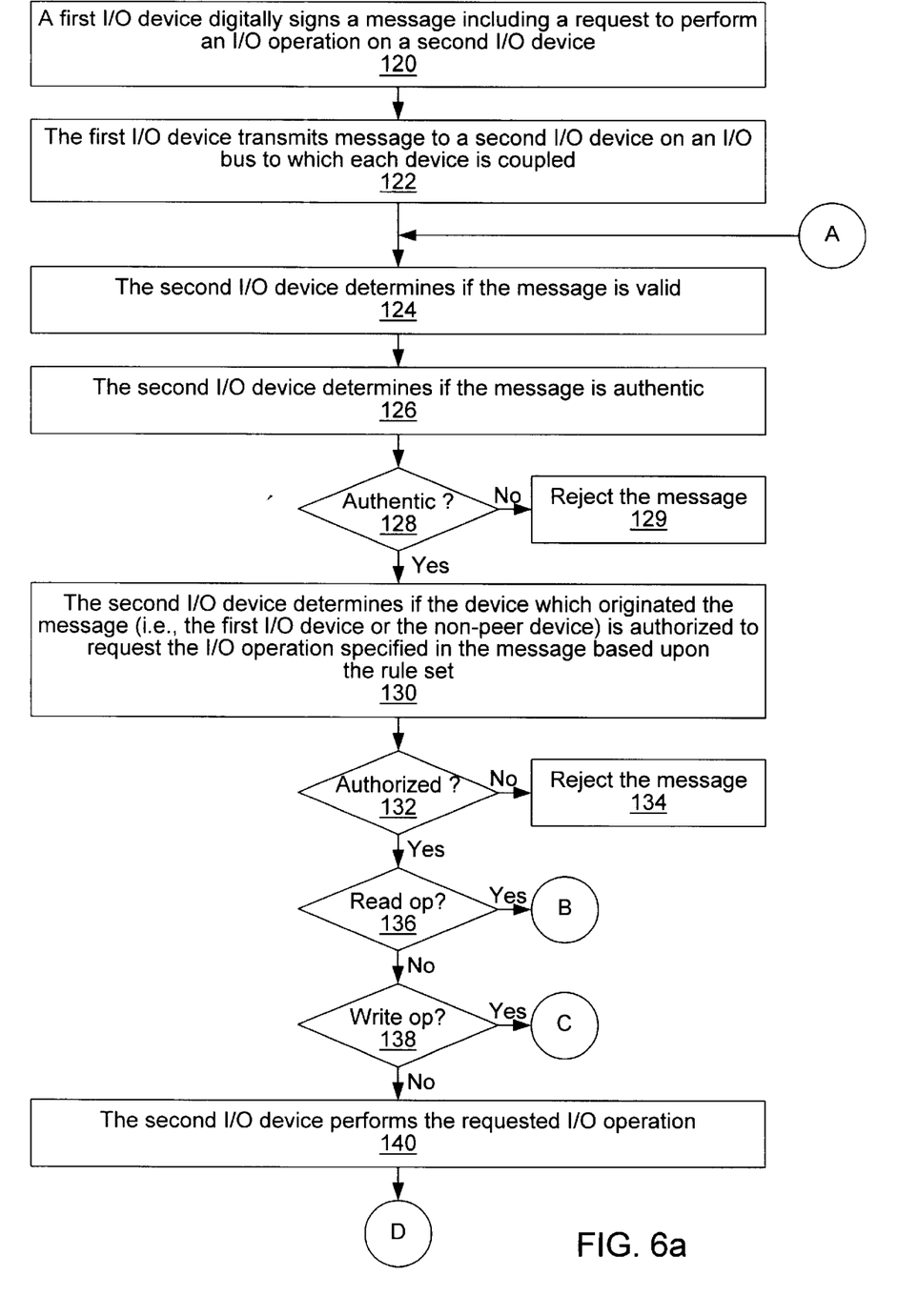
FIGS. 6a, 6b, 6c, 6d is a flowchart illustrating steps taken by the I/O devices of FIG. 3 to perform secure peer-to-peer communications.

Referring now to FIG. 6a, the first I/O device 42a desires the second I/O device 42b to perform a particular I/O operation. The first I/O device 42a forms a request to perform the I/O operation desired and encrypts a message including the I/O request in step 120. In one embodiment, the message conforms to messages defined in the I$_2$O Specification. In another embodiment, the message conforms to IEEE 1394 packets. In another embodiment, the message conforms to a Fibre Channel frame. In another embodiment the message conforms to a USB packet. Preferably, the first I/O device 42a does not encrypt the header portion of the message, but rather only the data or payload portion, which advantageously results in greater routing performance. However, in another embodiment, the entire message is encrypted, resulting in an improved ability to prevent unauthorized traffic analysis by an unauthorized device snooping the I/O bus 44. The first I/O device 42a encrypts the message by appending a digital sign, or key, to the message corresponding to the second I/O device 42b from its key set. In an alternate embodiment, the first I/O device 42a uses a stenographic means to encrypt the data.

The first I/O device 42a then transmits the message to the second I/O device 42b on the I/O bus 44, in step 122. The second I/O device 42b receives the message and decrypts the message (i.e., validates the encrypted message or determines if the message is "valid") in step 124. The second I/O device 42b uses the appropriate key from its key set to validate the message. Thus, via encryption, confidentiality is provided for the message as it is transferred between the first I/O device 42a and the second I/O device 42b. Examples of encryption algorithms which may be used to encrypt and decrypt the message are the Rivest-Shamir-Adleman (RSA) public key encryption algorithm, the data encryption standard (DES), the international data encryption algorithm (IDEA), the SKIPJACK scheme, and the LUC public key encryption system.

The second I/O device 42b determines if the message is authentic, in step 126. The second I/O device 42b uses a key in the key set to perform the authentication. Preferably, the first I/O device 42a performs the authentication on the message by one of the methods listed above, such as via a cryptographic checksum, hash code, or digital signature. A cryptographic checksum is a public function of the message and a secret key known by the first I/O device 42a and the second I/O device 42b and is included by the first I/O device 42a in the message. Cryptographic checksums are also referred to as message authentication codes (MACs). The second I/O device 42b, knowing the secret key also, recomputes the checksum and compares it with the checksum in the message. The authenticator may also be a hash code. Hash codes are also referred to as message digests. A hash code is a function of all the bits of the message and provides an error detection capability. Digital signatures, hash codes and cryptographic checksums are well know in the art of data encryption.

If the second I/O device 42b determines in step 128 that the message is not authentic, then the second I/O device 42b rejects the message, in step 129. Preferably, rejecting the message may also include logging the rejection of the message as a potential security violation attempt for security management purposes. Preferably, the second I/O device 42b logs the rejection of the message in a non-volatile memory for subsequent retrieval by the operating system 46.

If the message is authentic, the second I/O device 42b determines if the device which originated the message, i.e., the first I/O device 42a (or a non-peer device as will be discussed with reference to FIG. 6d), is authorized to request the I/O operation specified in the message based upon the rule set, in step 130. That is, the second I/O device 42b looks up the device which sent the message in its rule set and determines whether or not the I/O operation requested is authorized in the rule set for the requesting device. If the second I/O device 42b determines in step 132 that the request is not authorized, the second I/O device 42b rejects the message and logs the message rejection, in step 134.

If the requested I/O operation is authorized for the requesting device, the second I/O device 42b determines which type of I/O operation was requested. In particular, the second I/O device 42b determines if the requested I/O operation requires a data transfer from the second I/O device 42b to the first I/O device 42a (i.e., a READ), a data transfer from the first I/O device 42a to the second I/O device 42b (i.e., a WRITE), or no data transfer, in steps 136 and 138. If the I/O operation requires no data transfer, such as a seek operation, for example, the second I/O device 42b simply performs the operation, in step 140.

Figure 6B:
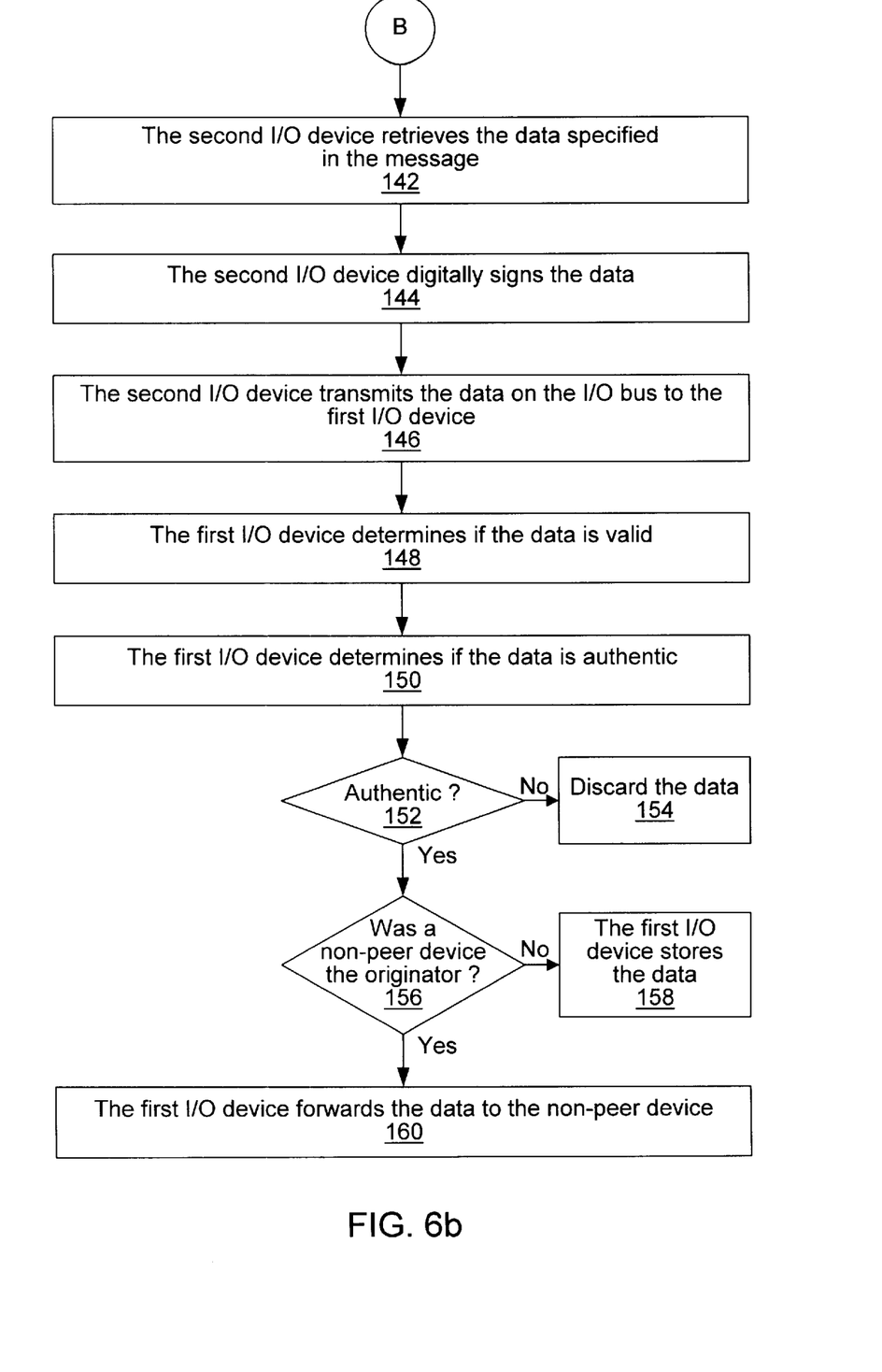

Referring now to FIG. 6b, if the I/O operation is a READ operation, the second I/O device 42b retrieves the data specified in the message, in step 142. For example, if the second I/O device 42b is a disk drive, the message may specify a starting logical sector address along with the number of sectors to read. The second I/O device 42b may encrypt the data, in step 144, by appending a digital signature to the message. Thereafter the message is transmitted upon the I/O bus 44 to the first I/O device 42a, in step 146. The first I/O device 42a receives the encrypted data from the I/O bus 44 and decrypts the encrypted data in step 148.

In one embodiment, the data is not transferred directly from the second I/O device 42b to the first I/O device 42a on the I/O bus 44. Instead, the second I/O device 42b encrypts and authenticates the data and transfers the encrypted and authenticated data to the system memory 46 and notifies the first I/O device 42a that the data is in the system memory 46. The first I/O device 42a then retrieves the encrypted data from the system memory 46 and decrypts and authenticates the encrypted data.

In one embodiment, the second I/O device 42b compresses the data as well as encrypts the data. Conversely, the first I/O device 42a decompresses the data as well as decrypts the data. Preferably, the second I/O device 42b compresses the data prior to encrypting it, thereby improving the compression characteristics of the data.

The first I/O device 42a determines if the data is authentic, in step 150. If the first I/O device 42a determines that the data is not authentic in step 152, the first I/O device 42a discards the data and logs the potential security violation, in step 154. If the data is authentic, the first I/O device 42a determines if itself was the originating device or whether a non-peer device was the originating device, in step 156. If the first I/O device 42a was the device originating the data transfer, i.e., the device which sent the I/O READ operation request message, then the first I/O device 42a stores the decrypted data, in step 158, and the I/O request is complete.

If a non-peer device originated the I/O READ operation, the first I/O device 42a forwards the data to the non-peer device, in step 160. Preferably, the first I/O device 42a encrypts the data prior to forwarding the data to the non-peer device. Alternatively, the first I/O device 42a does not decrypt the data when the encrypted data is received from the second I/O device 42b and the first I/O device 42a simply forwards the encrypted data to the non-peer device.

Figure 6C:
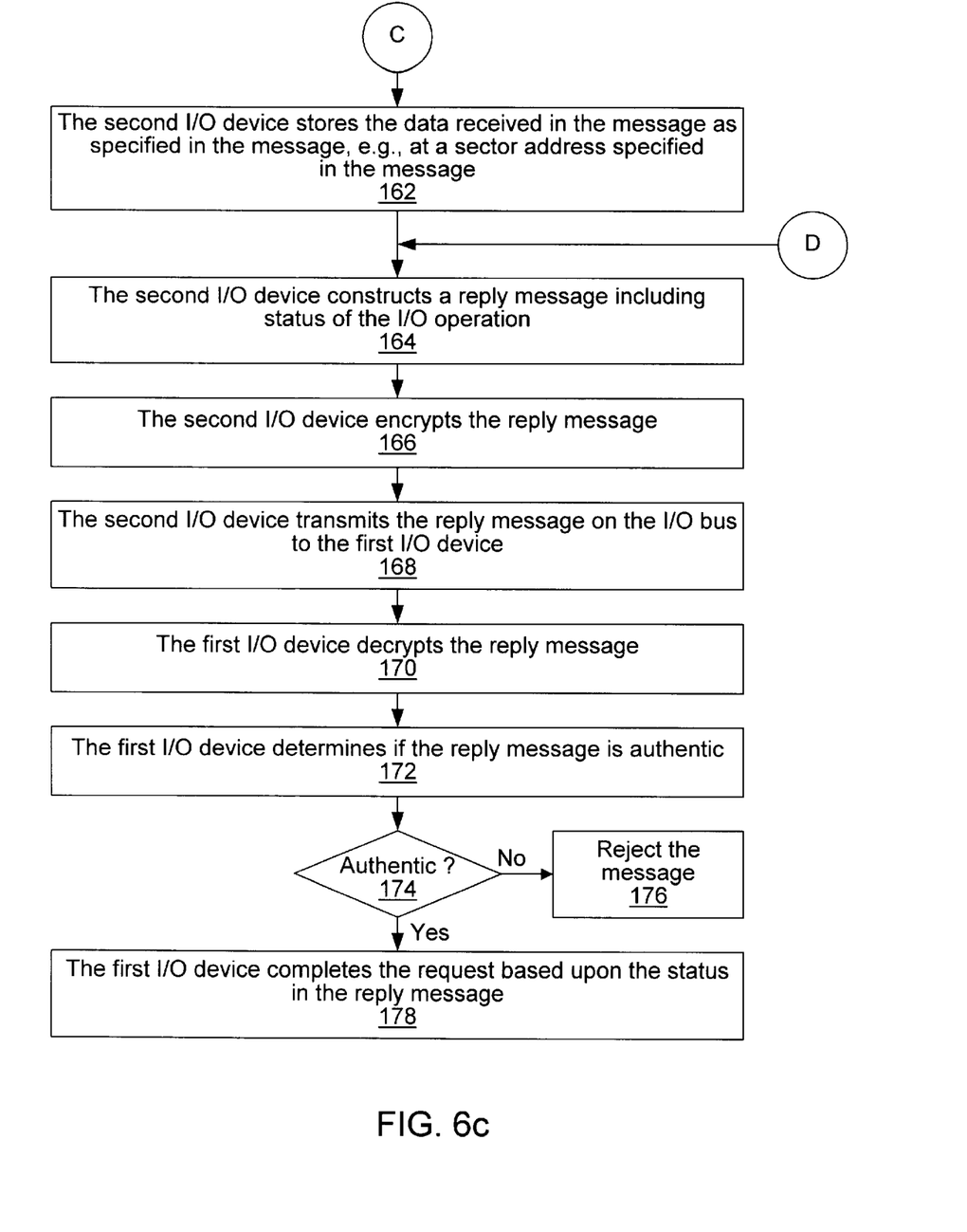

Referring now to FIG. 6c, if the second I/O device 42b determines that the request I/O operation is a WRITE operation, then preferably the data associated with the WRITE operation is included in the payload of the message received and is decrypted in step 124. Therefore, the second I/O device 42b stores the data according to the specification in the I/O request. As described previously, the transfer of the data may be a buffered transfer using system memory 46, rather than a direct transfer from the first I/O device 42a to the second I/O device 42b on the I/O bus 44. In another embodiment, the data is not included in the I/O operation request message, but rather the data transfer occurs subsequent to the authentication and authorization of the I/O operation request message. That is, after the second I/O device 42b authenticates and authorizes the I/O operation request, the second I/O device 42b instructs the first I/O device 42a to transfer the data.

After the second I/O device 42b stores the data associated with the WRITE operation in step 162 or performs the non-data transfer I/O operation in step 140, the second I/O device 42b constructs a reply message which includes the status of the I/O operation, in step 164. The status indicates to the originating device whether or not the requested I/O operation successfully completed. Preferably, the second I/O device 42b encrypts the reply message, in step 166, and transmits the encrypted reply message to the first I/O device 42a, in step 168.

The first I/O device 42a receives the encrypted reply message and decrypts the reply message, in step 170. The first I/O device 42a then determines if the reply message is authentic, in step 172. If the first I/O device 42a determines that the reply message is not authentic in step 174, the first I/O device 42a rejects the reply message and logs the rejection, in step 176. If the reply message is authentic, the first I/O device 42a uses the status in the reply message to complete the request, in step 178. By encrypting the request and reply messages, the method advantageously prevents attackers from monitoring the request traffic on the I/O bus 44, which may be valuable information apart from the data itself.

Figure 6D:
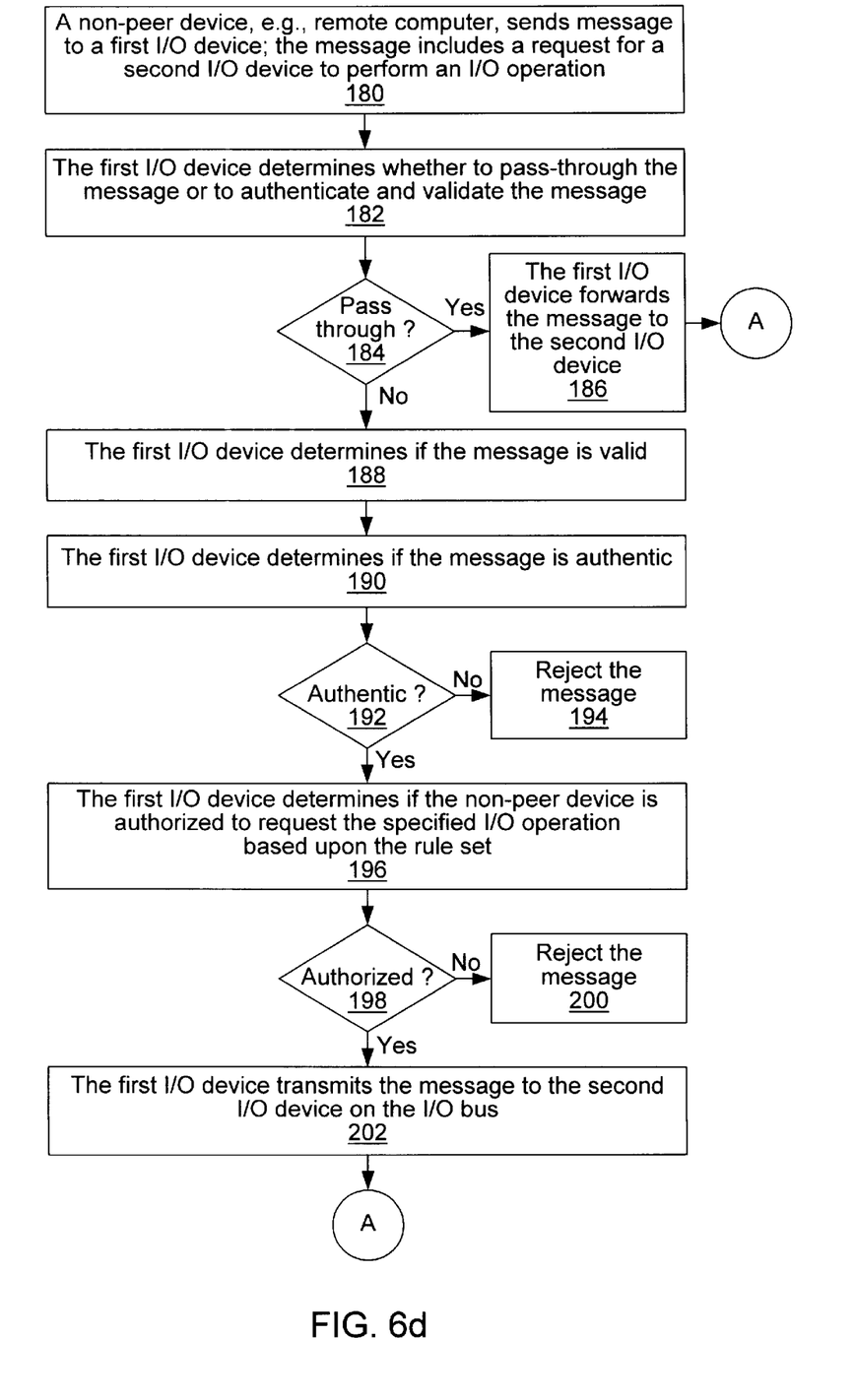

Referring now to FIG. 6d, an embodiment is described in which a non-peer device, such as a remote computer system, issues a packet or message or request 48 (of FIG. 3) to the first I/O device 42a which includes a request for the second I/O device 42b to perform an I/O operation. Thus, the first I/O device 42a in this embodiment may be a communications device, such as a network interface card, modem, or bus bridge. In this embodiment, the non-peer device sends a message to the first I/O device including the request for the second I/O device 42b to perform an I/O operation, in step 180. In this embodiment, steps 120 and 122 are not performed, but instead steps 180 through 202 are performed.

The first I/O device 42a receives the I/O request message and determines whether or not to pass the message through to the second I/O device 42b or to authenticate and validate the message, in step 182. If the first I/O device 42a determines in step 184 that it is configured to pass through the message, the first I/O device 42a forwards the message to the second I/O device 42b, in step 186, and the flow passes to step 124 and subsequent steps as already described above.

However, if the first I/O device 42a determines in step 184 that it is configured to function as a sort of "I/O bus firewall" to make the I/O bus 44 a secure communications channel, the first I/O device 42a decrypts the message, in step 188 and determines if the message is authentic, in step 190. If the first I/O device 42a determines in step 192 that the message is not authentic, the first I/O device 42a preferably rejects the message or discards the message, in step 194.

If the message is authentic, the first I/O device 42a determines if the non-peer device is authorized to request the specified I/O operation of the second I/O device 42b based upon the rule set of the first I/O device 42a, in step 196. Preferably, the rule set used in this embodiment is similar to the rule set of FIG. 5b, i.e., which includes identification information associated with the non-peer device. If the first I/O device 42a determines in step 198 that the I/O operation is not authorized, the first I/O device 42a rejects the message and logs the unauthorized request, in step 200. If the I/O operation is authorized, the first I/O device 42a transmits the encrypted message to the second I/O device 42b, in step 202, and flow passes to step 124 and subsequent steps as described above.

In an alternate embodiment, only the first I/O device 42a has the necessary key set to decrypt the message from the non-peer device. Therefore, in this embodiment, the first I/O device 42a re-encrypts the message prior to transmitting the message to the second I/O device 42b using a key or key set known by the first and second I/O devices.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for protecting a first device coupled to an input/output (I/O) bus from being accessed in an unauthorized manner by a second device coupled to the I/O bus, the method comprising:

transmitting to the first device a request to perform a peer-to-peer operation across the I/O bus without intervention from an operating system;

determining if said request is authentic as being dispatched from the second device;

determining if the second device is authorized to request the first device to perform said peer-to-peer operation; and performing said peer-to-peer operation by said first device, without intervention from the operating system, if said request is authentic from the second device and if the second device is authorized to request said peer-to-peer operation.

2. The method of claim 1, wherein the second device belongs to one of a set of I/O device classes, the method further comprising:

receiving a rule set by the first device which identifies a set of peer-to-peer operations which the second device is authorized to request the first device to perform based upon the I/O device class of the second device; and determining if the second device is authorized to request the first device to perform said peer-to-peer operation and determining if the second device is authorized to request said first device to perform said peer-to-peer operation based upon said rule set and said I/O device class of the second device.

3. The method of claim 2, wherein at least a portion of said rule set is received via user input.

4. The method of claim 2, wherein at least a portion of said rule set is based upon a predetermined rule set.

5. The method of claim 1, further comprising:

encrypting by the second device said request prior to said second device transmitting to the first device; and decrypting by the first device the encrypted said request prior to performing said peer-to-peer operation.

6. The method of claim 5, wherein said encrypting is performed using a private key and said decrypting is performed using a public key.

7. The method of claim 5, wherein said encrypting is authorized based on a digital signature comprising a hash which is encrypted by an originating said second device with a private key of the originating second device and then validated by a receiving said second device by recalculating the hash and then decrypting the transmitted hash and comparing the two values.

8. The method of claim 7, wherein the two values comprise the recalculated said hash and the decrypted hash.

9. The method of claim 1, wherein said peer-to-peer operation is a read operation, and wherein said performing said peer-to-peer operation comprises:

retrieving by the first device data specified in said peer-to-peer operation; and transmitting said data from the first device to the second device.

10. The method of claim 9, further comprising:

the second device determining if said data is authentic as transmitted by the first device;

the second device storing said data only if said data is authentic.

11. The method of claim 10, further comprising:

the first device encrypting the data prior to said transmitting said data to the second device;

the second device decrypting said data prior to said storing said data.

12. The method of claim 1, wherein said peer-to-peer operation is a write operation, wherein data is included in said request, and wherein said performing said peer-to-peer operation comprises:

the first device storing said data as specified in said request only if said data is authentically transmitted by the second device.

13. The method of claim 12, further comprising:

the first device encrypting a reply message including a status of the requested peer-to-peer operation and transmitting said reply message to the second device after the storing of said data;

the second device receiving said reply message and determining if said reply message is authentic from the first device.

14. The method of claim 1, wherein said determining if said request is authentic comprises verifying an authenticator appended to said request.

15. The method of claim 14, wherein said authenticator includes a digital signature.

16. The method of claim 15, further comprising the second device encrypting said request prior to said second device transmitting on the I/O bus said encrypted request, wherein said encrypted request is said authenticator.

17. The method of claim 14, wherein said authenticator includes a hash value.

18. The method of claim 1, further comprising:

the second device receiving a packet from a first computer system coupled to the second device, wherein said packet includes said request, wherein the first computer system is dissimilar from a second computer system in which the first and second devices are embodied;

the second device forwarding said request to the first device in response to said receiving said packet from the first computer system and prior to said second device transmitting on the I/O bus to the first device said request.

19. The method of claim 18, further comprising:
the second device determining if said packet is authentic from said first computer system; and
the second device forwarding said request to the first device only if said packet is authentic from said first computer system.

20. The method of claim 19, further comprising:
the second device determining if the first computer system is authorized to request said peer-to-peer operation; and
the second device forwarding said request to the first device only if the first computer system is authorized to request said peer-to-peer operation.

21. The method of claim 20, wherein said packet includes identification information associated with the first computer system, the method further comprising:
the second device receiving a rule set, wherein said rule set identifies a set of peer-to-peer operations which the first computer system is authorized to request the first device to perform based upon the identification information of the first computer system; and
wherein said second device determining if the first computer system is authorized to request said peer-to-peer operation comprises the second device determining if the first computer system is authorized to request said peer-to-peer operation based upon said rule set and said first computer system identification information.

22. A computer system, comprising:
an input/output (I/O) bus;
first and second devices coupled to the I/O bus,
wherein the second device is operable to transmit on the I/O bus to the first device a message including a request to perform a peer-to-peer I/O operation without intervention from an operating system;
wherein the first device is operable to receive said message and determine if said message is authentically derived from the second device;
wherein the first device is operable to determine if the second device is authorized to request the first device to perform said peer-to-peer I/O operation; and
wherein the first device performs said peer-to-peer I/O operation, without intervention from the operating system, only if said peer-to-peer I/O operation request is authentically derived from the second device and if the second device is authorized to request said peer-to-peer I/O operation.

23. The computer system of claim 22, wherein the second device belongs to one of a set of I/O device classes, wherein the first device is operable to receive a rule set, wherein said rule set identifies a set of peer-to-peer I/O operations which the second device is authorized to request the first device to perform based upon the I/O device class of the second device, wherein said first device determines if the second device is authorized to request said first device to perform said peer-to-peer I/O operation based upon said rule set and said I/O device class of the second device.

24. The computer system of claim 22, further comprising:
a system BIOS and a processor operable to execute said system BIOS, wherein said system BIOS is operable to provide said rule set to said first device; and
wherein the first device comprises a memory for storing said rule set received from said system BIOS.

25. The system of claim 22, wherein the second device is operable to encrypt said message prior to said second device transmitting to the first device said message and the first device is operable to decrypt said message prior to performing said peer-to-peer I/O operation.

26. The computer system of claim 25, wherein said second device memory is operable to store a key received from said system BIOS, wherein said second device uses said key to decrypt said message.

27. The computer system of claim 22, wherein the second device is operable to receive a packet from a remote computer system coupled to the second device, wherein said packet includes said request to perform said peer-to-peer I/O operation, wherein the second device is operable to create said message including said request to perform said peer-to-peer I/O operation in response to receiving said packet from the remote computer system.

28. The computer system of claim 27, wherein the second device is operable to determine if said packet is authentically derived from the remote computer system, wherein the second device transmits said message to the first device only if said packet is authentically derived from the remote computer system.

29. The computer system of claim 27, wherein the second device is operable to determine if the remote computer system is authorized to request said peer-to-peer I/O operation and the second device creates said message including said request to perform said peer-to-peer I/O operation only if the remote computer system is authorized to request said peer-to-peer I/O operation.

30. The computer system of claim 22, wherein said I/O bus is a bus selected from the list comprising: Peripheral Component Interconnect (PCI) bus, Fibre Channel bus, IEEE 1394 bus, Universal Serial Bus (USB).

31. An I/O device for coupling to an I/O bus, comprising:
a processor for performing security services;
a memory coupled to the processor for storing a rule set and a key;
wherein the I/O device is operable to receive on the I/O bus from a peer I/O device a message including a request to perform a peer-to-peer I/O operation without intervention from an operating system;
wherein the I/O device is operable to receive said message and determine if said message is authentically from the peer I/O device using said key stored in said memory;
wherein the I/O device is operable to determine if the peer I/O device is authorized to request the I/O device to perform said peer-to-peer I/O operation based upon said rule set stored in said memory; and
wherein the first device performs said peer-to-peer I/O operation, without intervention from the operating system, only if said peer-to-peer I/O operation request is authentically from the peer I/O device based upon said key and if the peer I/O device is authorized to request said peer-to-peer I/O operation based upon said rule set.

32. The I/O device of claim 31, wherein the peer I/O device belongs to one of a set of I/O device classes, wherein said rule set identifies a set of peer-to-peer I/O operations which the peer I/O device is authorized to request the I/O device to perform based upon the I/O device class of the peer I/O device, wherein said I/O device determines if said peer I/O device is authorized to request said I/O device to perform said peer-to-peer I/O operation based upon said rule set and said I/O device class of said peer I/O device.

33. The I/O device of claim 31, wherein the message is an encrypted message, wherein the I/O device is operable to decrypt said message using said key.

34. An I/O device for coupling to an I/O bus, comprising:
a processor for performing security services;

a memory coupled to the processor for storing a rule set and a key;

wherein the I/O device is operable to receive from a remote computer a packet including a request for a peer I/O device also coupled to the I/O bus to perform an I/O operation without intervention from an operating system;

wherein the I/O device is operable to determine if said packet is authentic from the remote computer using said key stored in said memory;

wherein the I/O device is operable to determine if the remote computer is authorized to request the peer I/O device to perform said I/O operation based upon said rule set stored in said memory; and wherein the I/O device forwards said I/O operation request to said peer I/O device only if said packet is authentically from the remote computer based upon said key and if the remote computer is authorized to request said I/O operation based upon said rule set.

* * * * *

UNITED STATES PATENT AND TRADEMARK OFFICE
CERTIFICATE OF CORRECTION

PATENT NO.   : 6,061,794
DATED        : May 9, 2000
INVENTOR(S)  : Michael F. Angelo, Sompong P. Olarig, David R. Wooten, Dand J. Driscoll It is certified that error appears in the above-identified patent and that said Letters Patent is hereby corrected as shown below:

Claim 1, column 13,
Line 42, before "if said", please insert -- only --.

Claim 26,
Line 1, after "wherein", please insert -- a memory of --.
Line 2, please delete "second" and insert -- first --.
Line 2, after "device", please delete "memory".
Line 3, please delete "second", and insert -- first --.

Signed and Sealed this

Eleventh Day of September, 2001

Attest:

NICHOLAS P. GODICI
Attesting Officer    Acting Director of the United States Patent and Trademark Office